United States Patent [19]
Masters

[11] Patent Number: 4,489,028
[45] Date of Patent: Dec. 18, 1984

[54] KAYAK IMPROVEMENTS
[76] Inventor: William E. Masters, 313 Dogwood La., Easley, S.C. 20640
[21] Appl. No.: 443,594
[22] Filed: Nov. 22, 1982
[51] Int. Cl.³ .............................................. B29C 5/04
[52] U.S. Cl. ................................. 264/154; 114/347; 264/275; 264/310
[58] Field of Search ............... 114/347, 352, 353, 354, 114/357; 441/130; D12/302; 264/154, 275, 310

[56] References Cited
U.S. PATENT DOCUMENTS 2,918,703 12/1959 Beal ...................................... 264/310
3,299,501 1/1967 Cox ...................................... 264/310
4,023,257 5/1977 Wright ................................. 264/275
4,143,193 3/1979 Rees ..................................... 264/310
4,214,670 7/1980 Berger et al. ........................ 264/310
4,357,293 11/1982 Williamson ......................... 264/310

Primary Examiner—James Derrington
Attorney, Agent, or Firm—Schwartz, Jeffery, Schwaab, Mack, Blumenthal & Koch

[57] ABSTRACT

The kayak improvements include a method for embedding a nut in the material of a kayak hull during a rotational molding process and structure for use with such an embedded nut to hold a frame in place.

4 Claims, 6 Drawing Figures

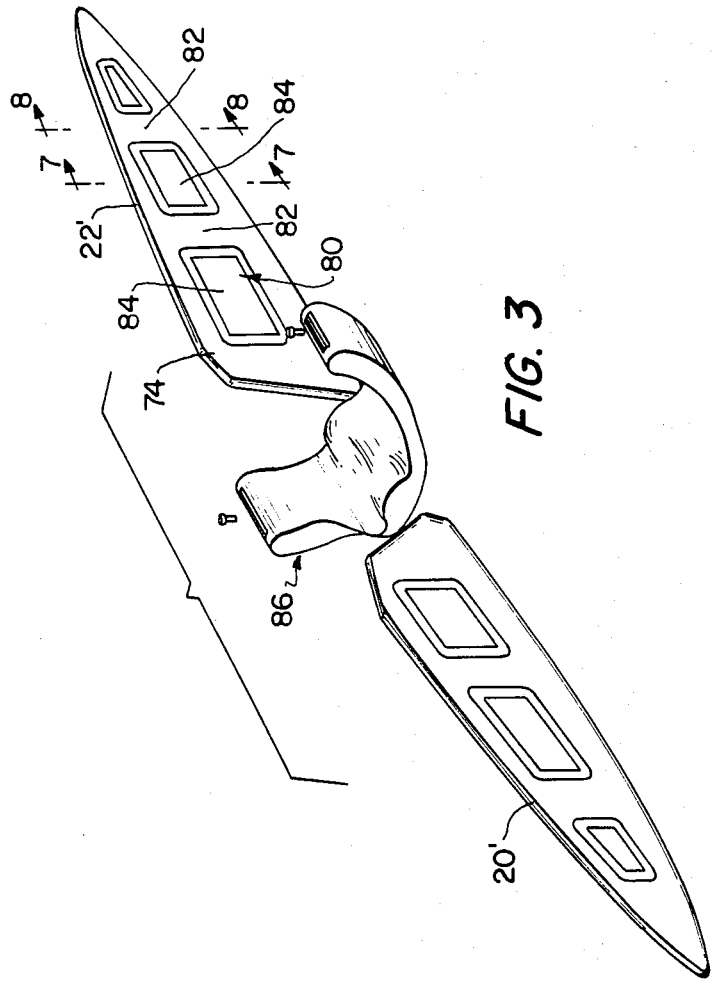
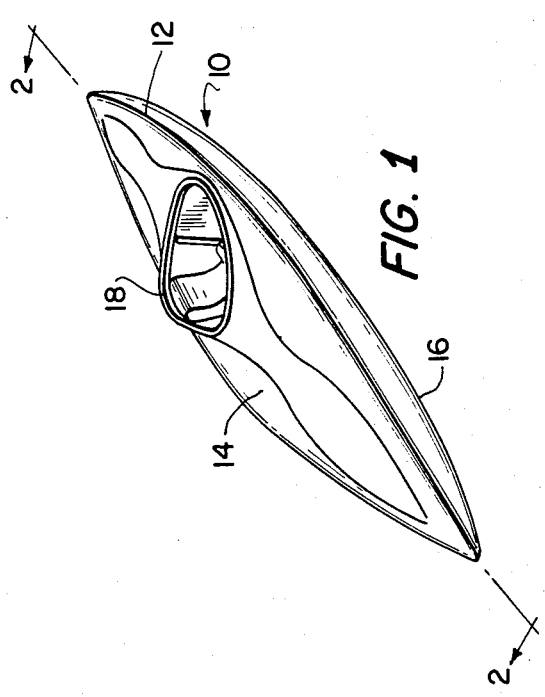
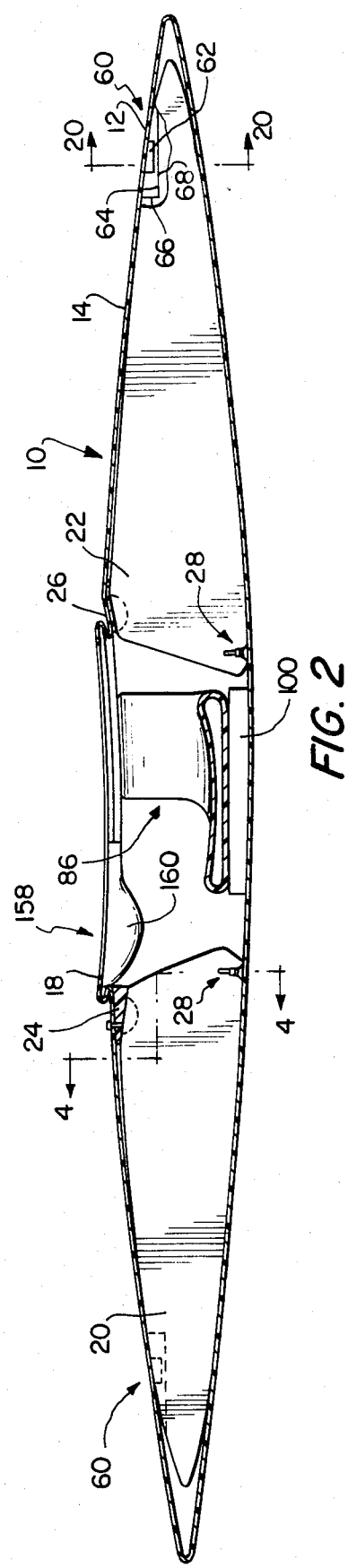

KAYAK IMPROVEMENTS

BACKGROUND OF THE INVENTION

1. Field of the Invention

The present invention relates to small boat components and especially to components for kayaks and methods for the manufacture of improved kayak constructions.

2. Discussion of Related Art

The sport of kayaking has gained in popularity over the last several years. For those enthusiasts who are properly trained and properly equipped, kayaks make an ideal and exciting mode of transportation along treacherous rivers and streams. Often, kayakers engage in competitions and aquatic maneuvers which require not only a great deal of skill on the part of the kayaker, but also a structurally sound craft which can withstand relatively severe forces imparted by currents encountered in rivers and streams. Furthermore, the kayaker should be able to control the craft with relative ease and have a sense of predictability concerning the control and effort required to perform any maneuver. In order to enhance the maneuverability of a kayak, the kayaker should be held tightly within the craft so as to translate body movements quickly and easily into movements of the kayak. The better the kayaker's "fit" in the kayak, the more predictable his or her movements will become.

Most modern kayaks are formed with a skin of a relatively lightweight, thin synthetic resin material, such as crosslink polyethylene. In order to increase the rigidity of the kayak, frame members in the form of pillars are normally inserted in the bow and stern portions of the kayak fore and aft of the kayak cockpit. An example of one such frame system can be seen in my copending U.S. patent application Ser. No. 263,562 wherein the pillars are retained in a holding element held by a seat. While such a frame system performs its intended function quite satisfactorily, it would be desirable to provide a structure by which the bow and stern pillars can be secured to the kayak hull in a less complicated manner. Further, it would be desirable to provide pillars with both an optimum rigidity characteristic and an aesthetically pleasing appearance. Normally, the bow and stern pillars of a kayak are formed from expanded foam material and cut into the desired configuration. While these pillars are quite strong and durable, their appearance has been a result of practical rather than aesthetic considerations. Accordingly, it would be desirable to provide pillars which are constructed to be more aesthetically pleasing and, at the same time, provide an enhanced degree of structural rigidity to the kayak.

Presently, kayaks incorporating a frame system according to my aforesaid U.S. patent application Ser. No. 263,562 provide a relatively secure fit for the kayaker by virtue of a rotationally molded seat and molded thigh braces which serve to permit kayakers to brace themselves within the kayak. Additionally, kayak seats are conventionally adjustable by unbolting and rebolting the seats in a desired position to accommodate the kayaker. However, it would be desirable to provide some structure whereby the seat would be more easily adjustable and also be able to be adapted to conform to the contours of an individual kayaker. In addition, it would be desirable to permit a kayaker to adjust the contour of the kayak thigh braces so as to further improve the fit of the kayak.

SUMMARY OF THE INVENTION

One object of the present invention is to provide a kayak having a frame system including pillars which can be bolted to the inner surface of the kayak hull without hindering the structural integrity or watertight construction of the hull.

A further object of the present invention is to provide a method by which elements can be attached to the inner surface of a rotationally molded structure without extending entirely through the attached wall of the rotationally molded structure.

In accordance with the above and other objects, the present invention includes a method of attaching an element to the inner surface of a rotationally molded structure. The method comprises connecting the element to one end of an elongated heat conductive member and attaching the heat conductive member to a mold for producing the structure such that the element is spaced from the mold by a distance sufficient to permit mold material to flow between the element and the mold. The structure is then rotationally molded in a conventional manner by rotating the mold around two axes whereby heat from the mold is transferred through the heat conductive member to the element and causes the mold material to melt around and adhere to the element when taking the shape of the mold. The element is disconnected from the heat conductive member when the molding process is completed.

The element may be threaded and the member may be connected to the element by screwing the element onto the member. Furthermore, the member is removed from the molded structure by cutting a portion out of the molded structure around the member.

The method can be applied to a kayak wherein the member is connected to the mold at a position to be occupied by the kayak cockpit opening, and the element is removed from the molded kayak hull after having been disconnected from the element by cutting the molded hull to form the cockpit opening.

BRIEF DESCRIPTION OF THE DRAWINGS

The foregoing and other objects of the present invention will become more readily apparent as the invention is more fully described in the detailed description below, reference being had to the accompanying drawings in which like reference numerals represent like parts throughout, and in which:

FIG. 1 is a perspective view of a kayak incorporating elements of the present invention;

FIG. 2 is a longitudinal sectional view taken substantially along section line 2—2 of FIG. 1;

FIG. 3 is a perspective view showing frame pillars and an adjustable seat which form part of the present invention;

DETAILED DESCRIPTION OF THE PREFERRED EMBODIMENTS

Figure 4:
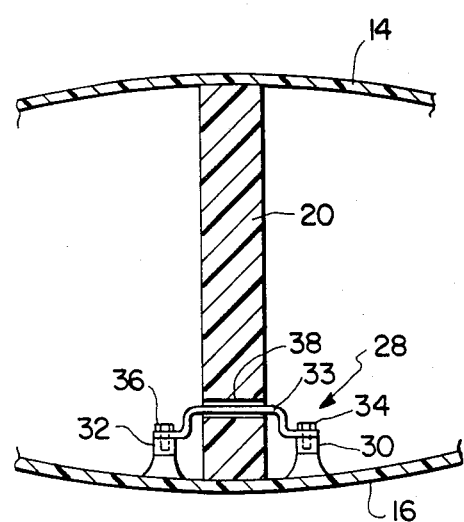
FIG. 4 is a part fragmentary, transverse sectional view showing one structure for connecting the pillars of the present invention to the kayak hull.

FIG. 1 shows a kayak 10 which comprises a hull 12 having a top wall 14 and a bottom wall 16 formed integrally in a single rotational molding process. A cockpit opening 18 is cut into the top wall 14. Referring to FIGS. 1 and 2, it will be seen that a frame system comprising bow pillar 20 and stern pillar 22 are inserted through cockpit 18 and positioned upright within the bow and stern portions of the kayak hull 12. Bow and stern pillars 20, 22 may be formed entirely of expanded foam material, such as expanded crosslink polyethylene, cut into a shape which conforms to the shape of top wall 14 and bottom wall 16 in the bow and stern portions, respectively, of the kayak hull 14. Pillars 20 and 22 must be held in an upright position in the lateral center of the kayak hull 14 such that one leg of a kayaker can be positioned on each side of the bow pillar 20. To facilitate such positioning, a forward mount 24 is provided to hold the rear upper portion of bow pillar 20 and a rear mount 26 is provided to hold the upper forward portion of stern pillar 22. These mounts are discussed in greater detail in my copending U.S. application Ser. No. 263,562. To hold the lower ends of pillars 20 and 22 in place, an attaching mechanism 28 is provided for each pillar. FIG. 4 shows the attaching mechanism 28 used to hold pillar 20 in greater detail. Attaching mechanism 28 includes a pair of nuts 30 and 32 which are actually embedded in the material of the bottom wall 16 such that nuts 30 and 32 are exposed only to the interior of the kayak hull. The top surfaces of nuts 30 and 32 are exposed and receive opposite ends of strap 33. Bolts 34 and 36 pass through openings in the opposite ends of strap 33 and are received in nuts 30 and 32, respectively. Strap 33 passes through an opening 38 formed in the associated pillar. As shown in FIG. 4, only pillar 20 is depicted, it being understood that pillar 22 contains a similar opening. From FIG. 4, it is clear that with pillar 20 received in the kayak hull, strap 33 is passed through opening 28 and connected to nuts 30 and 32 on opposite sides of the pillar by the use of bolts 34 and 36. The bolts 34 and 36 are tightened down to securely hold pillar 20 against the kayak hull. Attaching mechanism 28 keeps the lower portion of pillar 20 from moving laterally within the kayak hull and also is effective to inhibit longitudinal displacement of the pillar.

Figure 5:
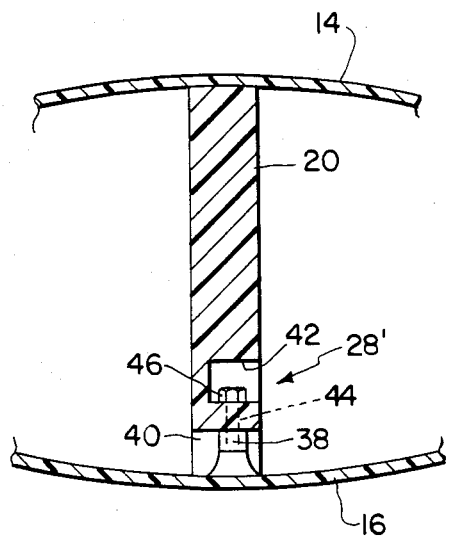
FIG. 5 is a part fragmentary, transverse sectional view showing an alternate structure for connecting the pillars of the present invention to the kayak hull.

FIG. 5 shows an attaching mechanism 28' which can be used in place of either of the attaching mechanisms 28 of FIG. 2. Attaching mechanism 28' comprises a single nut 38 which is also embedded in the material of the bottom wall 16 of the kayak hull. A notch 40 is formed in the lower surface of pillar 20 to receive nut 38. A second notch 42 is formed in the pillar at a position spaced vertically from notch 40. A bolt hole 44 extends downwardly through the pillar material between notches 42 and 40 and is aligned with the threaded opening of nut 38. A bolt 46 is passed through hole 44 and received in the threads of nut 38. Bolt 46 is tightened to secure pillar 20 to the kayak hull.

Clearly, either attaching mechanism 28 or attaching mechanism 29 can form a secure mounting for the associated pillar. The essential feature of either attaching mechanism is that nuts 30, 32, or 38 must be securely attached to the bottom kayak wall 16. The most secure engagement is effected by actually embedding the nuts in the kayak wall during the molding process. However, it is also desirable that the nuts do not extend through the bottom wall 16 and be exposed in any way through the outer surface of the kayak skin. Because the kayak hull is subjected to large and often erratic forces causing it to flex and bend, if an object is embedded in the skin so as to be exposed through both surfaces of the skin, it is very likely that the object would become loose causing a reduction in integrity of the hull or resulting in a water leak. Obviously, any such occurrence is to be avoided. For this reason, as shown in FIGS. 4 and 5, nuts 30, 32 and 38 are attached to the bottom wall 16 and exposed only to the interior of the kayak hull. FIGS. 4 and 5 show the nuts spaced inwardly of the wall by an exaggerated amount. Actually, the nuts can be attached to the wall in any manner such that the thickness of the wall is not substantially reduced in the area beneath the nuts.

Kayak 10 is formed by a rotational molding process wherein molding material such as powdered crosslink polyethylene is placed within a mold cavity, the mold is heated and rotated causing the mold material to melt and coat the inner surface of the cavity. The mold is then removed to expose the kayak hull. The cockpit opening 18 of the kayak is then cut into the hull and the seat, framework, etc. of the kayak are mounted in the hull. Conventionally, if a metal object is to be embedded in the mold material, it must be attached to the mold itself in order to be in heat transfer relation to the mold thus causing the mold material to melt and adhere to the object. However, if a nut is attached directly to the mold and embedded in the skin of the kayak in this manner, the nut will be exposed through the outer surface of the kayak causing the problems discussed above. Accordingly, a novel rotational molding process must be used to embed nuts 30, 32 and 38 in the kayak hull in the manner described above.

Figure 6:
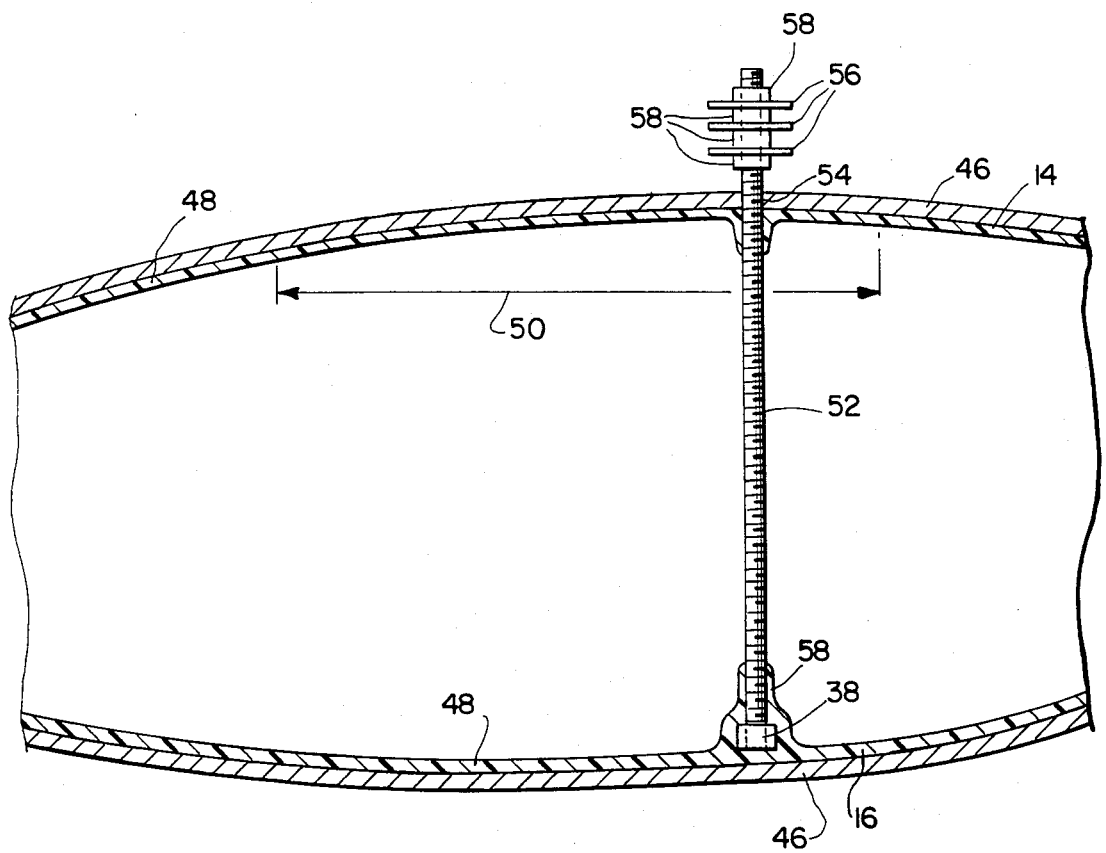
FIG. 6 is a diagrammatic view depicting the method for attaching the connecting elements used in FIGS. 4 and 5 to the interior surface of the kayak hull.

With reference to FIG. 6, a mold 46 is shown. Mold 46 constitutes a portion of a rotational molding system the details of which are known and do not form a part of this invention. The system itself can be that shown in my prior U.S. Pat. No. 4,247,279 issued Jan. 27, 1981. Mold 46 is charged with a molding material such as powdered polyethylene and rotated about two axes of rotation while being heated such that the mold material adheres to the interior of the mold as shown at 48. Conventionally, the mold is placed in an oven during the molding process and heated externally. After being heated, the mold is cooled by fans.

Mold material 48 forms the kayak hull. As shown in FIG. 6, the mold is oriented such that the upper portion forms the kayak hull top 14 and the lower portion forms the kayak hull bottom 16. The portion of the mold material indicated by double headed arrow 50 is to be removed to form the cockpit opening. A threaded heat transfer rod 52 passes through a threaded opening 54 in the mold 46. Threaded hole 54 is formed in the mold in the vicinity of the area 50 which is to form the cockpit opening. A nut, such as nut 38, is attached to the inner end of rod 52 and the rod is adjusted such that the nut is spaced from the wall of mold 46 opposite to opening 54 by a distance which is approximately equal to or slightly greater than the desired thickness of the bottom wall 16. The opposite end of rod 52 extends out of mold 46 and contains a plurality of fins 56 which are attached by nuts 58. The number of fins 56 used can be adjusted so that the desired amount of heat is transferred through rod 52 to nut 38. Clearly, a separate rod 52 can be used for the connection of each nut, or a single rod having a forked end can be used to connect a plurality of nuts.

As can be understood from the discussion above, due to the contact made between rod 52 and mold 46 and due to fins 56, sufficient heat will be transferred through rod 52 to nut 38 to cause mold material 48 which contacts the nut to melt and merge with the mold material forming the kayak hull. Because nut 38 is spaced inwardly from the portion of mold 46 which forms lower wall 16, nut 38 will not extend through the lower wall 16. After the mold has been cooled and removed from the molded kayak, the section of the kayak indicated at 50 will be cut out and the mold material 58 around the top of nut 38 will be trimmed off and rod 52 can be unscrewed from nut 38. As a result, nut 38 will be contained integrally in the skin of the kayak for use in connecting pillars, as discussed above, or other elements which require bolting.

Rod 52 can be an elongated brass rod. Brass appears to work quite well in transferring sufficient heat to the nut to ensure that the mold material will be melted. However, if more heat is needed, it may be necessary to use a specially designed thermal pin. Such pins are specifically designed to transfer heat to the interior of a rotational mold for the purpose of rapidly transferring heat into the mold and for leveling out hot spots. Such pins can be obtained in the form of elongated threaded rods from Noren Products, Inc. of Menlo Park, Calif.

The above discussion is set forth for the purpose of illustrating the present invention but is not considered to limit the scope of the invention in any way. Clearly, numerous modifications, additions, and other changes to the embodiments set forth above could be made by one of ordinary skill in the art without departing from the scope of the invention as set forth in the appended claims.

What we claim is:

1. A method of attaching an element to the inner surface of a rotationally molded structure, comprising:
    connecting said element to one end of an elongated heat conductive member;
    attached said heat conductive member to a mold for producing said structure such that said element is spaced from said mold by a distance sufficient to permit mold material to flow between said element and said mold;
    rotationally molding said structure by heating said mold, filling said mold with mold material, and rotating said mold, whereby heat from said mold is transferred through said heat conductive member to said element and causes said mold material to melt around and adhere to said element when taking the shape of said mold;
    removing said member from said molded structure by cutting a portion out of said molded structure around said member and disconnecting said element from said heat conductive member.

2. The method of claim 1, wherein said element is threaded and said member is connected to said element by screwing said element onto said member.

3. The method of claim 1, wherein said structure is a kayak and said member is connected to said mold at a position to be occupied by the kayak cockpit opening, and said element is removed from the molded kayak after having been disconnected from said element by cutting said molded structure to form said cockpit opening.

4. The method of claim 1, wherein said member is connected to said mold to include an exposed portion extending out of said mold and the amount of heat transferred to said element is adjusted by attaching cooling surfaces to the exposed portion of said member.

* * * * *